United States Patent Office 3,549,766
Patented Dec. 22, 1970

3,549,766
REDUCING HYPERSENSITIVITY TO PENICILLINS WITH CERTAIN PHENOXYPROPANOLS
Frank Milan Berger and George Masaaki Fukui, Princeton, N.J., assignors to Carter-Wallace, Inc., New York, N.Y., a corporation of Maryland
No Drawing. Filed June 2, 1965, Ser. No. 460,829
Int. Cl. A61k 21/00
U.S. Cl. 424—271
24 Claims

ABSTRACT OF THE DISCLOSURE

A method of eliminating or reducing hypersensitivity to penicillins in warm-blooded animals by administering, in conjunction with the penicillin, certain phenoxypropanols or phenoxypropanediols. Representative compounds include 1-o-toloxy-2-propanol, 3-p-chlorophenoxy-1,2-propanediol, 3-o-toloxyl - 1,2-propanediol, 3-p-chlorophenoxy-1-propanol, and 3-phenoxy-1,2 propanediol.

---

The present invention relates to an immunological method. More particularly, the invention relates to a method of eliminating or reducing hypersensitivity to penicillins.

The value of penicillin drugs has been somewhat limited due to the number of persons which are hypersensitive to the drugs and which, upon administration thereof, develop reactions thereto ranging from mild erythema, or hives, to severe serum sickness and, in some cases, to acute anaphylaxis.

It has been estimated that approximately one out of twenty persons are hypersensitive to penicillins, to one degree or another. Consequently, a physician must use extreme caution in administering the drugs and must be prepared to administer resuscitative drugs, such as epinephrine or aminophylline, should a severe reaction result in the patient.

It is an object of the invention to provide a method of reducing hypersensitivity to penicillins in warm-blooded animals. It is another object to provide a specific method of reducing hypersensitivity to penicillins without interfering either with the therapeutic effectiveness thereof or with other immunological body mechanisms. It is a further object to provide penicillin-containing compositions which are substantially free of undesirable side reactions. These and other objects of the present invention will become apparent to one skilled in the art in the light of the instant specification.

In its broad aspect, the invention relates to a method of reducing hypersensitivity to penicillins in a warm-blooded animal, said method comprising administering a penicillin to said animal in conjunction with an effective amount of a compound of the formula:

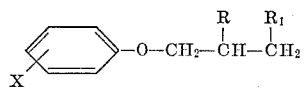

wherein X is selected from the group consisting of hydrogen, halogen, lower alkyl and lower alkoxy; and R and R₁ are each selected from the group consisting of hydrogen and hydroxyl, at least one being hydroxyl.

As used herein and in the appended claims, the terms "lower alkyl" and "lower alkoxy" signify respectively alkyl and alkoxy radicals having from one to about six carbon atoms.

The compounds of the invention, which can be chemically classified as phenoxypropanols or phenoxypropanediols, can be conveniently prepared by the method of Wheeler and Willson (Arg. Syn, Coll. vol. 1, 2nd ed., p. 296) by the condensation of an appropriate sodium phenolate with an appropriate halohydrin.

As used herein and in the appended claims, the terms "penicillin(s)" and "penicillin drugs" encompass natural, synthetic and semisynthetic penicillin-type drugs and salts thereof which produce hypersensitivity in certain susceptible warm-blooded animals, especially in humans.

The phenoxypropan(edi)ols of the present invention can be administered orally in the form of tablets or capsules, sublingually in the form of a suitable tablet, or as solutions in a suitable solvent system. Alternatively, the present compounds can be dissolved in suitable solvents to give injectable solutions or can be compounded with a suitable base to form suppositories.

In general, it is preferred to administer the phenoxypropan(edi)ols of the present invention prior to or concurrently with the penicillin drugs. If the phenoxypropan(edi)ols are administered before the penicillin drugs, they can be suitably administered orally in a solid form, i.e., as tablets or capsules, approximately from about 10 to about 30 minutes before the penicillin drug. If said compounds are given concurrently with the penicillins, they can be given separately therefrom or in physical admixture therewith, regardless of the mode of administration of the penicillin drugs. For example, the medication could be given orally as a tablet containing both the penicillin drug and the phenoxypropan(edi)ol or as an intramuscular injection containing both materials in solution therein.

Table I, which follows, sets forth a representative number of compounds operable in the practice of the present invention.

TABLE I

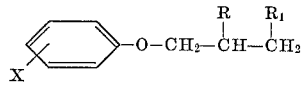

| Compound No.: | X | R | R₁ |
|---|---|---|---|
| 1 | o-CH³— | —OH | —H |
| 2 | H— | —OH | —H |
| 3 | p-Cl— | —OH | —OH |
| 4 | o-CH³— | —OH | —OH |
| 5 | p-Cl— | —OH | —H |
| 6 | o-CH³— | —H | —OH |
| 7 | p-Cl— | —H | —OH |
| 8 | H— | —OH | —OH |
| 9 | o-CH³O— | —OH | —OH |

The activities of the phenoxypropan(edi)ols of the invention was determined by injecting one-tenth ml. of serially diluted Penicillin G antisera, prepared by the method of Levine et al. (J. Exp. Med., 114, 1961, 888), intradermally on three separate areas on one side of a guinea pig. Dilutions of 1/25, 1/50 and 1/100 were used.

The other side of the guinea pig was injected in a similar manner in separate area with one-tenth ml. of commercial BSA (bovine serum albumen) antisera (1/2000 dilution) and one-tenth ml. physiological saline solution.

Groups of at least five guinea pigs were used in the evaluation of each compound.

Four hours later 4 ml. of the test solutions, in a concentration of 1 percent (weight/volume) were injected into the peritoneal cavity of the guinea pigs to provide a dosage of active compound of approximately 100 mg. per kg. of animal body weight. Control animals received 4 ml. of physiological saline solution by the same route.

Thirty to forty-five minutes later a 1.0 ml. mixture containing 1.0 mg. of BSA, 10 mg. of KPG (potassium penicillin G) and 1 mg. of HGG (human gamma globulin) in 0.5% Evans Blue dye solution was injected intravenously in each test animal. The KPG and HGG were incubated together at pH 11.0 for 3 hours at 37° C. prior to use to produce the TPG–HGG conjugate described by Levine (J. Medicinal Chem., 7, 1964, 675).

Fifteen minutes later the reactions at the sites of intradermal injections were visually observed and scored [passive cutaneous anaphylaxis (PCA) score] as follows, based on the diffusion of the Exans Blue dye around the injection site:

0 No reaction
1+ Very light blue ring, about 2–5 mm. in diameter
2+ Light blue ring, about 5–10 mm. in diameter
3+ Light blue ring, about 10–15 mm. in diameter
4+ Dark blue ring, about 15–20 mm. in diameter In general, all animals showed no reaction at the site of the saline injection and substantial reaction at the site of the BSA antisera injection. The latter shows that the action of BSA, a classic antigen which gives a very strong immunological reaction, is not inhibited by the phenoxypropan(edi)ols of the invention and, consequently, that the action of the latter compounds is specific with respect to penicillin drugs.

The percent suppression of penicillin hypersensitivity for each compound was calculated according to the following formula:

$$\% \text{ Suppression at a given antisera concentration} = \frac{\text{Cumulative PCA score in X control animals minus cumulative PCA score in X treated animals}}{\text{Cumulative PCA score in X control animals}} \times 100$$

Table II, which follows, illustrates the PCA scores at different antisera concentrations for an illustrative compound of the invention and the calculation therefrom of percent suppression values:

are Compound 1 (1-o-tolyloxy-2-propanol) and Compound 3-(3-p-chlorophenoxy-1,2-propanediol).

In general, the compounds of the invention are administered in a dose sufficient to substantially prevent the occurence of immunological reactions due to penicillin administration or to substantially reduce the severity thereof. Such dosage varies, of course, with the penicillin hypersensitivity of the person to whom the penicillin is administered, to the mode of administration and to the penicillin dosage. In general, a unit dosage of phenoxypropan(edi)ols in the range of from about 50 mg. to about 2000 mg., and preferably in the range of from about 100 mg. to about 1000 mg., is effective in reducing or inhibiting immunological reactions due to penicillin administration. It has been found that the compounds of the invention are substantially nontoxic at doses at which immunological reactions are prevented or substantially reduced.

In order to show that the phenoxypropan(edi)ols of the present invention specifically act to prevent immunological reactions due to the administration of penicillins without interfering with the valuable antibiotic properties thereof, the following experiments were carried out:

Mice, in groups of twenty, were challenged intraperitoneally with 1000 viable cells of *Streptococcus mastitidis*.

Four hours after challenge, Group II mice received intraperitoneally Potassium Penicillin G (10 mg./kg.) and Group III mice received 3 - p - chlorophenoxy-1,2-propanediol, a representative compound of the invention, at a dosage of 10 mg./kg. Group IV mice similarly received a combination of Potassium Penicillin G and 3-p-chlorophenoxy-1,2-propanediol (10 mg./kg. of each compound). Group I mice served as controls.

TABLE II

| Compound Injected | Guinea Pig No. | PCA reaction at sera dilution | | | | |
|---|---|---|---|---|---|---|
| | | Anti-Penicillin G | | | Anti-BSA | Saline |
| | | 1/25 | 1/50 | 1/100 | 1/200 | |
| Saline (control) | 1 | 3+ | 2+ | 1+ | 4+ | 0 |
| | 2 | 3+ | 2+ | 2+ | 4+ | 0 |
| | 3 | 3+ | 3+ | 2+ | 4+ | 0 |
| | 4 | 3+ | 2+ | 1+ | 4+ | 0 |
| | 5 | 3+ | 3+ | 1+ | 4+ | 0 |
| PCA Score | | 15 | 12 | 7 | 20 | 0 |
| 1-o-tolyloxy-2-propanol (Compound 1) | 21 | 0 | 0 | 0 | 4+ | 0 |
| | 22 | 0 | 0 | 0 | 4+ | 0 |
| | 23 | 2+ | 1+ | 0 | 4+ | 0 |
| | 24 | 0 | 0 | 0 | 4+ | 0 |
| | 25 | 0 | 0 | 0 | 4+ | 0 |
| PCA Score | | 2 | 1 | 0 | 20+ | |

NOTE:
Percent suppression (KPG·Ab, 1/25) = $\frac{15-2}{15} \times 100 = 87\%$.

Percent suppression (KPG·Ab, 1/50) = $\frac{12-1}{12} \times 100 = 92\%$.

Percent suppression (KPG·Ab, 1/100) = $\frac{7}{7} \times 100 = 100\%$.

Percent suppression (BSA·Ab, 1/2000) = $\frac{20-20}{20} \times 100 = 0$.

Table III, which follows, sets forth the effectiveness of a representative number of the present phenoxypropan(edi)ols in terms of percent suppression of penicillin hypersensitivity. The percent suppression indicated is an average obtained from several tests at 1/25 sera dilution.

TABLE III

| | Total No. of guinea pigs tested | Percent suppression |
|---|---|---|
| Compound No.: | | |
| 1 | 25 | 92 |
| 3 | 20 | 90 |
| 4 | 20 | 78 |
| 7 | 20 | 75 |
| 8 | 15 | 76 |

As is apparent from the above results, the most preferred compounds in the practice of the present invention Test mice continued to receive Potassium Penicillin G and/or 3-p-chlorophenoxy-1,2-propanediol in the aforementioned dosages twice daily for three successive days. Chemotherapy was then terminated and the animals were observed for an additional three days to see if there might be relapses.

The results are summarized in Table IV, which follows:

TABLE IV

| Group No. | Cumulative No. dead/total No. in group | | | | | | Percent survival after six days |
|---|---|---|---|---|---|---|---|
| | No. of days after challenge | | | | | | |
| | 1 | 2 | 3 | 4 | 5 | 6 | |
| I | 0/20 | 14/20 | 18/20 | 18/20 | 18/20 | 18/20 | 10 |
| II | 0/20 | 0/20 | 0/20 | 0/20 | 0/20 | 0/20 | 100 |
| III | 0/20 | 14/20 | 17/20 | 17/20 | 18/20 | 19/20 | 5 |
| IV | 0/20 | 0/20 | 0/20 | 0/20 | 0/20 | 2/20 | 90 |

It is apparent from the above results that the percent survivals of mice receiving Potassium Penicillin G alone and of mice receiving Potassium Penicillin G in combination with a phenoxypropan(edi)ol of the present invention are statistically similar.

When the above experiment was repeated with the exception that chemotherapy was initiated 24 hours rather than 4 hours after challenge, the percent survival of mice receiving Potassium Penicillin G alone was 60 whereas the percent survival of mice receiving a combination of Potassium Penicillin G and 3 - p - chlorophenoxy - 1,2-propanediol was 65.

The above results clearly indicate that the phenoxypropan(edi)ols of the invention do not interfere with the antibiotic properties of penicillins.

The invention in its broader aspect is not limited to the specific steps, methods and compositions herein described but departures may be made therefrom within the scope of the accompanying claims without departing from the principles of the invention and without sacrificing its chief advantages.

What we claim is:

1. A method of reducing hypersensitivity to penicillins in a warm-blooded animal, said method comprising administering a penicillin to said animal in conjunction with an effective amount of a compound of the formula:

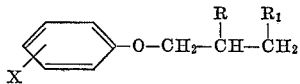

wherein X is selected from the group consisting of hydrogen, chlorine lower alkyl and lower alkoxy; and R and $R_1$ are each selected from the group consisting of hydrogen and hydroxyl, at least one being hydroxyl.

2. The method of claim 1 wherein the compound is 1-o-tolyloxy-2-propanol.
3. The method of claim 1 wherein the compound is 3-p-chlorophenoxy-1,2-propanediol.
4. The method of claim 1 wherein the compound is 3-o-tolyloxy-1,2-propanediol.
5. The method of claim 1 wherein the compound is 3-p-chlorophenoxy-1-propanol.
6. The method of claim 1 wherein the compound is 3-phenoxy-1,2-propanediol.
7. A method of reducing hypersensitivity to penicillins in a warm-blooded animal, said method comprising administering to said animal, prior to the administration of the penicillin drug, an effective amount of a compound of the formula:

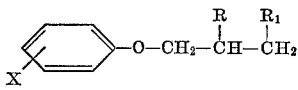

wherein X is selected from the group consisting of hydrogen, chlorine, lower alkyl and lower alkoxy; and R and $R_1$ are each selected from the group consisting of hydrogen and hydroxyl, at least one being hydroxyl.

8. The method of claim 7 wherein the compound is 1-o-tolyloxy-2-propanol.
9. The method of claim 7 wherein the compound is 3-p-chlorophenoxy-1,2-propanediol.
10. The method of claim 7 wherein the compound is 3-o-tolyloxy-1,2-propanediol.
11. The method of claim 7 wherein the compound is 3-p-chlorophenoxy-1-propanol.
12. The method of claim 7 wherein the compound is 3-phenoxy-1,2-propanediol.
13. An oral composition comprising, in combination, a penicillin and an effective amount to reduce hypersensitivity thereto, of a compound of the formula:

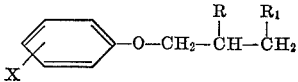

wherein X is selected from the group consisting of hydrogen, chlorine, lower alkyl and lower alkoxy; and R and $R_1$ are each selected from the group consisting of hydrogen and hydroxyl, at least one being hydroxyl.

14. The composition of claim 13 wherein the compound is 1-o-tolyloxy-2-propanol.
15. The composition of claim 13 wherein the compound is 3-p-chlorophenoxy-1,2-propanediol.
16. The composition of claim 13 wherein the compound is 3-o-tolyloxy-1,2-propanediol.
17. The composition of claim 13 wherein the compound is 3-p-chlorophenoxy-1-propanol.
18. The composition of claim 13 wherein the compound is 3-phenoxy-1,2-propanediol.
19. An injectable composition comprising, in combination, a penicillin and an effective amount to reduce hypersensitivity thereto, of a compound of the formula:

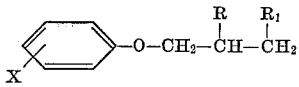

wherein X is selected from the group consisting of hydrogen, chlorine, lower alkyl and lower alkoxy; and R and $R_1$ are each selected from the group consisting of hydrogen and hydroxyl, at least one being hydroxyl.

20. A composition as claimed in claim 19 wherein the compound is 1-o-tolyloxy-2-propanol.
21. A composition as claimed in claim 19 wherein the compound is 3-p-chlorophenoxy-1,2-propanediol.
22. A composition as claimed in claim 19 wherein the compound is 3-o-tolyloxy-1,2-propanediol.
23. A composition as claimed in claim 19 wherein the compound is 3-p-chlorophenoxy-1-propanol.
24. A composition as claimed in claim 19 wherein the compound is 3-phenoxy-1,2-propanediol.

References Cited

FOREIGN PATENTS 759,577  10/1956  Great Britain ____ 167—65AB

ALBERT T. MEYERS, Primary Examiner

V. D. TURNER, Assistant Examiner

U.S. Cl. X.R.

424—340